United States Patent
Rose et al.

(10) Patent No.: US 8,880,746 B2
(45) Date of Patent: Nov. 4, 2014

(54) METHOD USING VIRTUAL ASIC PINS TO RECONFIGURE HARDWARE

(75) Inventors: Kenneth M. Rose, Palo Alto, CA (US); David S. Walker, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 2096 days.

(21) Appl. No.: 11/343,984

(22) Filed: Jan. 31, 2006

(65) Prior Publication Data

US 2007/0189324 A1    Aug. 16, 2007

(51) Int. Cl.
  *G06F 3/00*   (2006.01)
  *G06F 1/22*   (2006.01)
  *G06F 9/445*  (2006.01)

(52) U.S. Cl.
  CPC .............. *G06F 1/22* (2013.01); *G06F 9/44505* (2013.01)
  USPC ............................................................ 710/8

(58) Field of Classification Search
  USPC ............................................................ 710/8
  See application file for complete search history.

(56) References Cited

U.S. PATENT DOCUMENTS

| | | | | |
|---|---|---|---|---|
| 5,315,707 A * | 5/1994 | Seaman et al. | .................. | 710/56 |
| 6,658,021 B1 * | 12/2003 | Bromley et al. | ............. | 370/466 |
| 7,424,636 B1 * | 9/2008 | Grah et al. | .................... | 713/600 |
| 2001/0028646 A1 * | 10/2001 | Arts et al. | ..................... | 370/386 |
| 2005/0281096 A1 * | 12/2005 | Bhakta et al. | ................. | 365/193 |

* cited by examiner

*Primary Examiner* — Henry Tsai
*Assistant Examiner* — Juanito Borromeo
(74) *Attorney, Agent, or Firm* — Campbell Stephenson LLP

(57) ABSTRACT

An apparatus and method for unconditionally loading a value into first memory of an first integrated circuit, which operates in one of several different modes depending on value stored in the first memory. In one embodiment, apparatus comprises a printed circuit board. The first integrated circuit (IC) is mounted on the printed circuit board, wherein the first IC comprises a first memory device, and wherein the first IC is configured to operate in a first mode when a first value is stored in the first memory device, and wherein the first IC is configured to operate in a second mode when a second value is stored in the first memory device. The printed circuit board also includes a second IC mounted thereon. The second IC comprises a second memory device that stores the first value. A third IC mounted on the printed circuit board is configured to provide a copy of the first value stored in the second memory device to the first IC for storage in the first memory device, wherein the third IC is configured to provide the copy of the first value to the first IC without condition.

16 Claims, 4 Drawing Sheets

US 8,880,746 B2

METHOD USING VIRTUAL ASIC PINS TO RECONFIGURE HARDWARE

BACKGROUND OF THE INVENTION

Application specific integrated circuits (ASICs) are devices that perform a specific data processing operation. ASICs are often used in place of or in addition to a general purpose microprocessor. A general purpose microprocessor, if it is executing the appropriate instructions, can perform any data processing operation that can be performed by an ASIC. However, an ASIC can typically perform the operation faster because the ASIC does not incur the overhead of fetching, interpreting and executing the instructions. Because of this advantage, ASICs are often used in place of or in addition to microprocessors in systems such as line cards of a switch or router, where operational speed is a critical factor. The present invention will be described with reference to line cards, it being understood that the present invention should not be limited thereto.

Before they begin operation, ASICs of line cards are typically configured by a microprocessor executing instructions of, for example, an operating system. To illustrate, FIGS. 1A and 1B show relevant components of exemplary line cards 10A and 10B, respectively, in block diagram form. Line card 10A is manufactured by mounting a random access memory (RAM) 14, ASIC 16, read only memory (ROM) 20 and microprocessor 22 on printed circuit board 12. ASIC 16 is coupled between RAM 14 and microprocessor 22 via communication links 24 and 26, respectively. Microprocessor 22 is coupled to ROM 20 via communication link 26. Although not shown, each of the communication links 24 and 26 may take form in a plurality of electrically conductive traces formed on the layers and layer-interconnects of printed circuit board 12. The layer-interconnects are vertical pieces of metal that connect traces on different layers of printed circuit board 12. The conductive traces of communication links 24 or 26 can transmit data (e.g., configuration values) between devices (e.g., microprocessor 22 and ASIC 16). ROM 20 stores an operating system executable by microprocessor 22. Components 12-22 on line card 10B are structurally identical to components 12-22, respectively, on line card 10A. Moreover, ROM 20 of line card 10B stores the same operating system that is stored in ROM 20 of line card 10A.

ASIC 16 of line card 10A is structurally identical to ASIC 16 of 10B as noted above. Each ASIC 16 is configured to operate according to any one of at least two modes OM_A or OM_B depending on a multi bit configuration value A or B, respectively, stored in a configuration register (not shown) within ASIC 16. For purposes of explanation only, the present invention will be described with reference to ASIC 16 having just one configuration register, it being understood that the term ASIC should not be limited to devices containing only one configuration register. ASICs and other integrated circuits may operate according to any one of several modes depending on a configuration values loaded into their respective configuration registers.

Returning to FIGS. 1A and 1B, a configuration value, once stored in ASIC 16's configuration register, defines ASIC 16's mode of operation. To illustrate, when a configuration value A is stored in the configuration register of ASIC 16, ASIC 16 will operate in mode OM_A. And when a different configuration value B is stored in ASIC 16's configuration register, ASIC 16 will operate in mode OM_B. ASIC 16 can process data read from RAM 14 via communication link 24 while operating in mode OM_A or mode OM_B. However, the same data read from RAM 14 may be processed differently by ASIC 16 to produce a different result, depending on whether ASIC 16 is operating in mode OM_A or mode OM_B. Because ASIC can operate in any one of at least two modes, ASIC 16 can be used in the manufacture of at least two line cards that function differently.

Each time line card 10A or line card 10B is powered up, started or restarted, the operating system stored in ROM 20 is provided to and executed by microprocessor 22. One purpose of the operating system, when executed, is to select the appropriate configuration value to be stored in the configuration register of ASIC 16. Selection of the configuration value is conditional on line card information (LCI) stored in ROM 20. LCI typically provides information about line card components (e.g., RAM 14) such as their operating characteristics, an identity of the line card manufacturer, serial number, the intended use of the line card (e.g., whether it is to be used as a supervisory line card of a router), etc. Line card information is stored in ROM 20 when line card cards 10A and 10B are first manufactured. Line card information stored in ROM 20 can vary from line card to line card. For example, presume line card information LCIA is stored in ROM 20 of line card 10A and line card information LCIB is stored in ROM 20 of line card 10B, and that LCIA is different from LCIB.

As noted, microprocessor 22 selects the appropriate configuration value to be stored in the configuration register of ASIC 22 based on the LCI stored in ROM 20. FIG. 2 is a flow chart illustrating relevant aspects performed by microprocessor 22 when it first starts executing the operating system stored in ROM 20. More particularly, just after line card 10A or 10B is powered up, microprocessor 22 reads the LCI from ROM 20 as shown in step 32. Microprocessor compares the LCI read from ROM 20 with LCIA. If the LCI read from ROM 20 equals LCIA, then microprocessor 22 provides configuration value A to ASIC 16 for storage in its configuration register as shown in step 36. However, if the LCIA read from ROM 20 does not equal LCIA, then microprocessor 22 provides configuration value B to ASIC 16 for storage in its configuration register as shown in step 38. Because ROM 20 in line card 10A stores LCI equal to LCIA, microprocessor 22 of line card 10A loads configuration value A into the configuration register of ASIC 16. In contrast, because ROM 20 of line card 10B stores LCI equal to LCIB, microprocessor 22 loads configuration value B into the configuration register of ASIC 16. Once configuration value A is stored in the configuration register of ASIC 16 in line card 10A, ASIC 16 operates according to mode OM_A. In contrast, once configuration value B is stored in the configuration register of ASIC 16 and line card 10B, ASIC 16 operates according to mode OM_B. Importantly, FIG. 2 emphasizes the conditional nature of selecting a configuration value for ASIC 16 in both line cards 10A and 10B. In other words, the microprocessor 22 selects the configuration value to be loaded into ASIC 16 based on the LCI stored in ROM 20.

Line cards evolve with time and undergo subsequent redesign for a variety of reasons. The redesign of a line card may require the redesign and/or replacement of the components thereof. ASIC 16 may need to be redesigned to provide additional modes of operations that accommodate changes in other components of the line card. More often than not, ASICs are redesigned to be backwards compatible. To illustrate, presume RAM 14 of line cards 10A and 10B operate according to the double data rate-1 (DDR-1) protocol. ASIC 16, regardless of operating in mode OM_A or mode OM_B, is designed to accommodate the DDR-1 protocol of RAM 14 such that ASIC 16 is capable of reading data from or writing data to RAM 14. Line cards could be manufactured with RAM 14 replaced by a RAM that operates according to the DDR-2 protocol. ASIC 16, however, is incompatible with the DDR-2 protocol. In other words, if RAM 14 of line card 10A or 10B is replaced with a RAM that operates according to the DDR-2 protocol, ASIC 16 would be incapable of reading data from or writing data to the DDR-2 RAM. However, ASIC 16 could be redesigned so that, when configured by microprocessor 22 as set forth above, ASIC 16 is compatible with the DDR-1 or DDR-2 protocol.

FIGS. 3A and 3B illustrate relevant components of line cards 40A and 40B, respectively, in block diagram form. Line card 40A is the same as line card 10A shown in FIG. 1A with ASIC 16 replaced by ASIC 42. Line card 40B is similar to line card 40A. However, line card 40B includes RAM 44 instead of RAM 14. RAM 44 operates according to the DDR-2 protocol, while RAM 14 operates according to the DDR-1 protocol. ASIC 42 represents a backwards compatible, redesign of ASIC 16 shown in FIGS. 1A and 1B. ASIC 42 has been redesigned to operate according to any one of at least four modes depending on a configuration value stored in its configuration register (not shown). Thus, when configuration value A_DDR-1 is stored in the configuration register of ASIC 42, ASIC 42 will operate in mode OM_A_DDR-1. In this mode, ASIC 42 processes data the same way ASIC 16 processes data when it is operating in mode OM_A. However, ASIC 42, while operating in mode OM_A_DDR-1 is compatible with DDR-1 RAM, but not DDR-2 RAM. When configuration value A_DDR-2 is stored in ASIC 42's configuration register, ASIC 42 will operate in mode OM_A_DDR-2. In this mode, ASIC 42 processes data in the same fashion as ASIC 16 operating in mode OM_A. However, when ASIC 42 operates in mode OM_A_DDR-2, ASIC 42 is compatible with DDR-2 RAM, but not DDR-1 RAM. When configuration value B_DDR-1 is stored in ASIC 42's configuration register, ASIC 42 will operate in mode OM_B_DDR-1. While operating in mode OM_B_DDR-1, ASIC 42 processes data the same way ASIC 16 processes data when it is operating in mode OM_B. However, ASIC 42, while operating in mode OM_B_DDR-1 is compatible with DDR-1 RAM, but not DDR-2 RAM. Lastly, when configuration value B_DDR-2 is stored in the configuration register of ASIC 42, ASIC 42 will operate in mode OM_B_DDR-2. In this mode, ASIC 42 processes data the same way ASIC 16 processes data when it is operating in mode OM_B. However, ASIC 42, when operating in mode OM_B_DDR-2 is compatible with DDR-2 RAM, but not DDR-1 RAM.

Just like ASIC 16, ASIC 42 must be configured each time line card 40A or 40B is powered up, started or restarted. Each time line card 40A or line card 40B is powered up, started or restarted, the operating system stored in ROM 20 is provided to and executed by microprocessor 22. This operating system, when executed, selects the appropriate configuration value (i.e., A_DDR-1, A_DDR-2, B_DDR-1, or B_DDR-2) to be stored in the configuration register of ASIC 42 based on the LCI stored in ROM 20. The operating system of line cards 40A or 40B are identical. Unfortunately, the operating system of line cards 10A or 10B cannot be used in line cards 40A or 40B. The operating system stored in line cards 10A and 10B could be used in line cards 40A and 40B if the operating system of line cards 10A and 10B are modified to accommodate the additional operational modes of ASIC 42. For purposes of explanation, it will be presumed that the operating system of line cards 40A and 40B is the operating system of line cards 10A and 10B after the operating system of line cards 10A and 10B is modified.

As noted, the selection of the appropriate configuration value for ASIC 42 is conditional on LCI stored in ROM 20. For purposed of explanation, presume ROM 20 of line card 40A stores LCI set to LCI_A_DDR-1 while ROM 20 of line card 40B stores LCI set to LCI_B_DDR-2. LCI_A_DDR-1 indicates that the line card has been manufactured with DDR-1 RAM, while LCI_B_DDR-2 indicates that the line card has been manufactured with DDR-2 RAM. FIG. 4 illustrates relevant aspects performed by microprocessor 22 of line card 40A or 40B when microprocessor 22 beings executing the operating system stored in ROM 20. Specifically, in step 52, microprocessor 22 of line card 40A or 40B reads the LCI from ROM 20. The LCI read from ROM 20 is compared to LCI_A_DDR-1. If the LCI read from ROM 20 compares equally to LCI_A_DDR-1, then microprocessor 22 provides configuration value A_DDR-1 to ASIC 42 for storage in its configuration register as shown in 56, and the process ends. If the LCI value read from ROM 20 does not equate with LCI_A_DDR-1, then the process proceeds to compare the LCI read from ROM 20 with LCI_A_DDR-2. If the LCI read from ROM equates to LCI_A_DDR-2, then microprocessor 22 provides configuration value A_DDR-2 to ASIC 42 for storage in its configuration register as shown in step 62, and the process ends. However, if LCI does not equate to LCIA DDR-2, then microprocessor 22 compares the LCI value read from ROM 20 to LCI_B_DDR-1. If these two values compare equally, then microprocessor 22, as shown in step 66, provides configuration value B_DDR-1 to ASIC 42 for storage in its configuration register, and the process ends. If the value read from ROM 20 does not equate to LCI_B_DDR-1, then microprocessor 22 provides configuration value B_DDR-2 to ASIC 42 for storage in its configuration register as shown in step 68, and the process ends.

A comparison between FIG. 2 and FIG. 4 shows that the operating system of line cards 40A or 40B is substantially different than the operating system of line cards 10A and 10B. This leads to the conclusion that the operating system of a line card may need to be revised each time the ASIC is redesigned to include additional modes of operation. However, line card manufacturers or purchasers may be reluctant to employ modified line card operating systems. Operating systems, such as those used in line cards, may be qualified thru extensive testing. Line card purchasers may contractually require the line cards they buy to be supplied with a given operating system or be given rights of approval before any new or modified operating system is supplied. Thus, line card manufacturers may not be able to design and build new cards with new ASICs and unilaterally decide to modify or upgrade the operating systems of the line cards to accommodate the new ASICs.

BRIEF DESCRIPTION OF THE DRAWINGS

The present invention may be better understood in its numerous objects, features, and advantages made apparent to those skilled in the art by referencing the accompanying drawings.

DETAILED DESCRIPTION

The present invention provides a method and apparatus in which devices such as ASIC can be unconditionally configured to operate in any one of many modes. The present invention will be described with reference to an ASIC, it being understood that the present invention can be employed with respect to any integrated circuit which requires a configuration value before it can begin operating in any one of many distinct modes. Moreover, the present invention will be described with reference to ASICs employed in line cards, it being understood that the present invention should not be limited thereto.

Figure 1A:
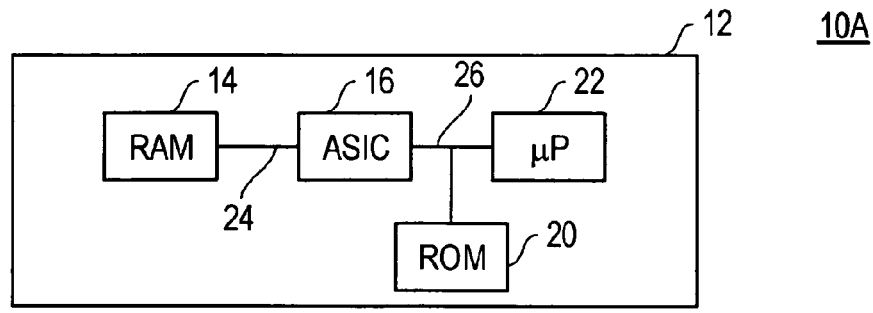
FIGS. 1A and 1B show relevant components of prior art line cards in block diagram form.
Figure 1B:
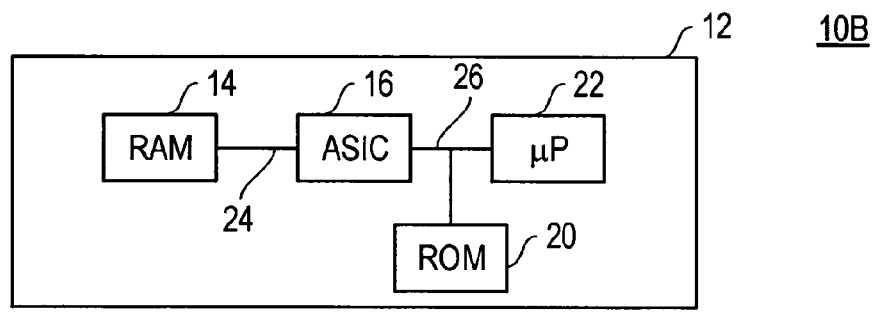
Figure 3A:
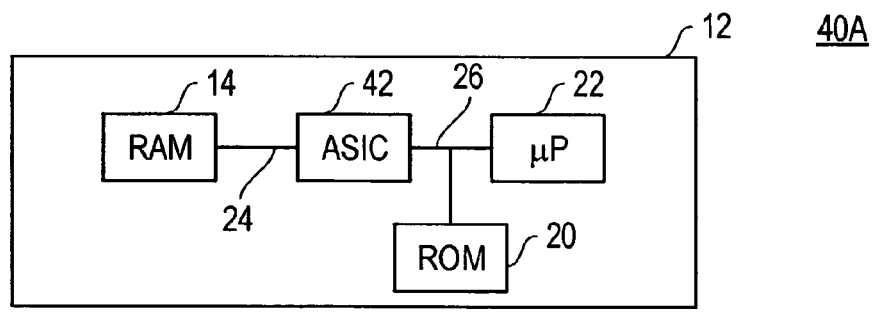
FIGS. 3A and 3B show relevant components of prior art line cards.
Figure 3B:
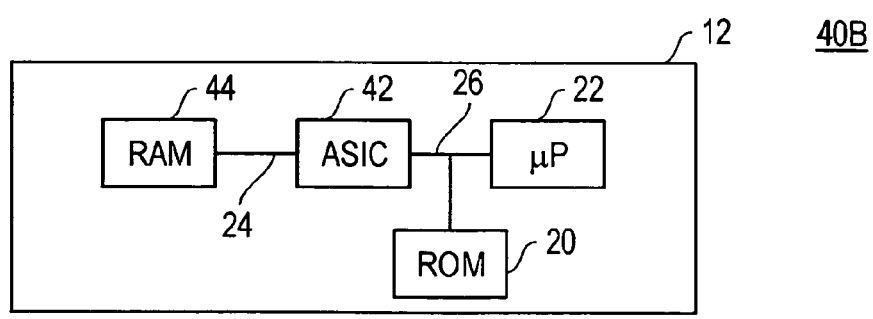
Figure 2:
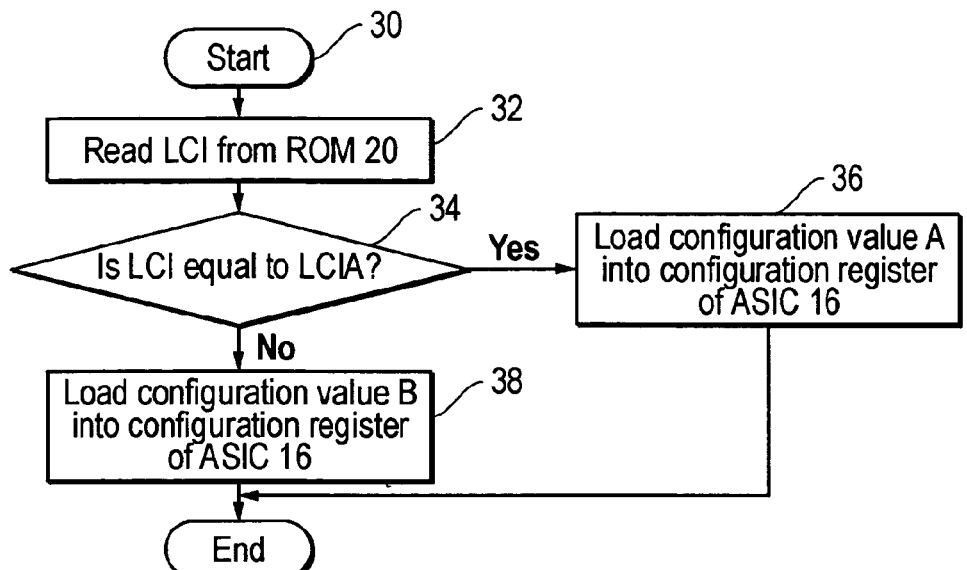
FIG. 2 illustrates relevant operational aspects performed by the microprocessors of FIGS. 1A and 1B.
Figure 4:
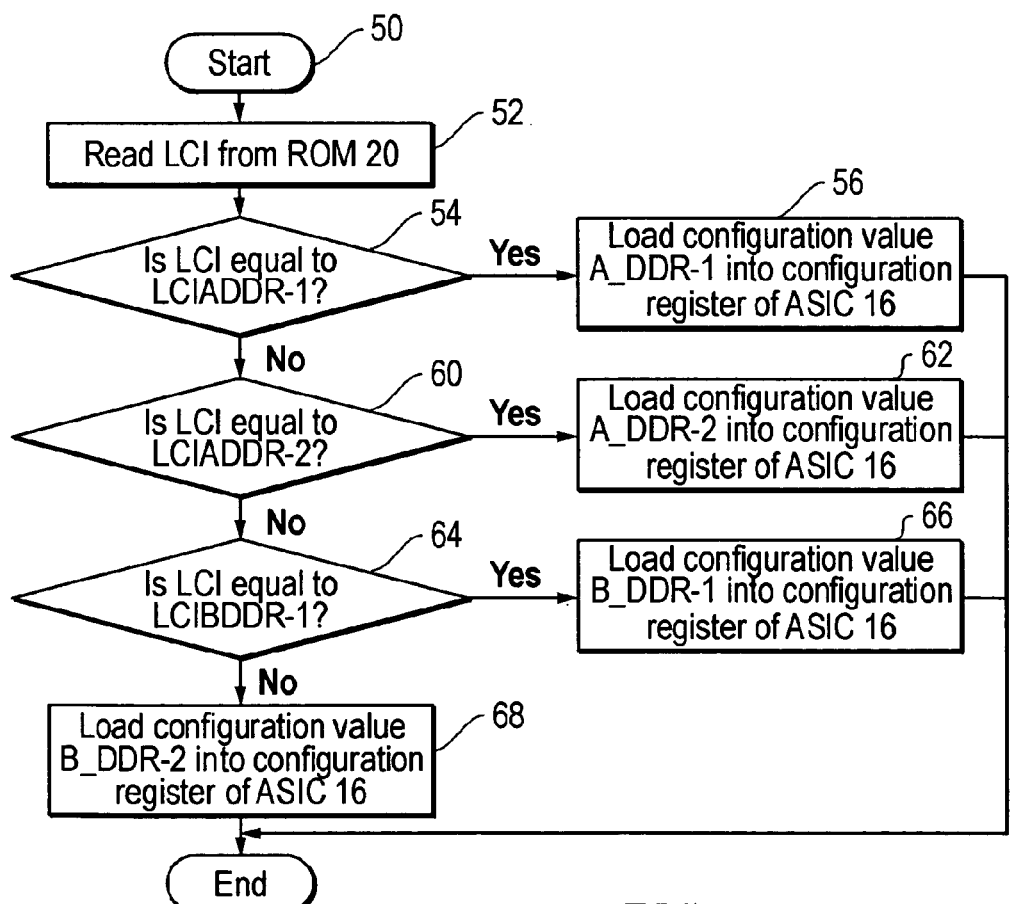
FIG. 4 illustrates relevant operational aspects performed by the microprocessors of FIGS. 3A and 3B.
Figure 5A:
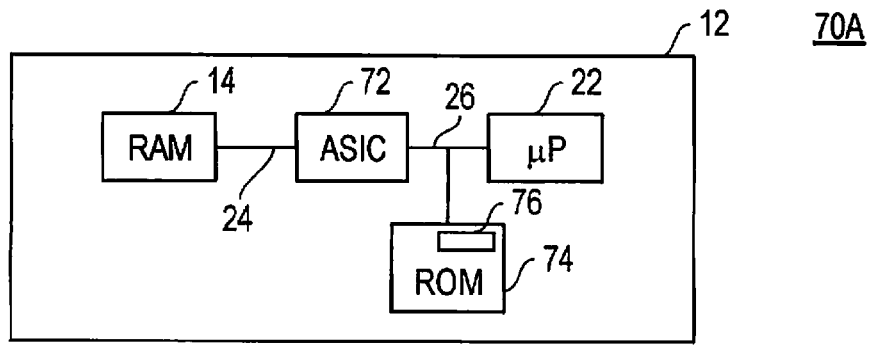
FIGS. 5A and 5B show relevant components of exemplary line cards employing one embodiment of the present invention.
Figure 5B:
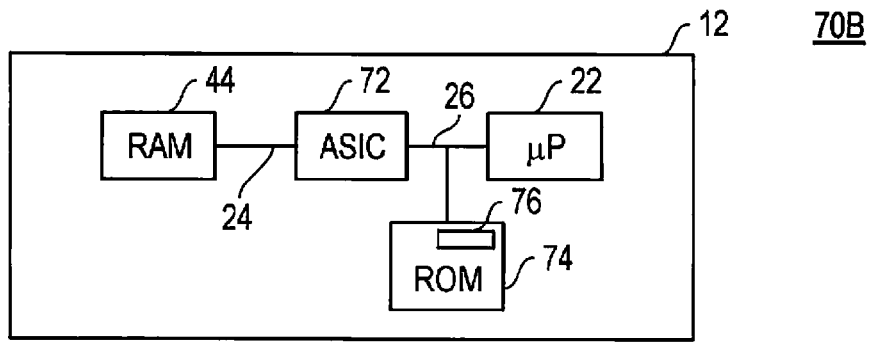

FIGS. 5A and 5B illustrate relevant components of line cards 70A and 70B, respectively, in block diagram form. Line cards 70A and 70B employ one embodiment of the present invention. Line card 70A is manufactured by mounting RAM 14, ASIC 72, microprocessor 22, and ROM 74 on printed circuit board 12. ASIC 72 is coupled between RAM 14 and microprocessor 22 via communication links 24 and 26, respectively. Microprocessor 22 is also coupled to ROM 74 via communication link 26. Each of the communication links 24 and 26 may take form in a plurality of electrically conductive traces formed on the layers and layer-interconnects of printed circuit board 12. The layer-interconnects are vertical pieces of metal that connect traces on different layers of printed circuit board 12. Conductive traces of a communication link can transmit data (e.g., a configuration value) between devices (e.g., microprocessor 22 and ASIC 72).

In an alternative embodiment, ROM 74 could be replaced by a field programmable gate array, however, the present invention will be described with use of ROM 74, it being understood that the present invention should not be limited thereto. ROM 74 may store an operating system executable by microprocessor 22. ROM 74 may be used for things such as address mapping, reset control, etc. Additionally, ROM 74 may include a register 76 or other memory that permanently stores a configuration value to be unconditionally loaded into ASIC 72 as will be more fully described below. It should be noted that register 76 need not be contained in ROM 74. Rather, register 76 or an equivalent memory device may be contained in another device that is accessible by microprocessor 22. When a separate device is used to store a configuration value in its register 76, ROM 74 should be completely identical between line cards using the present invention. However, the present invention will be described with reference to ROM 74 containing register 76. It should also be noted that when line card 70A is manufactured, one configuration value is stored in register 76 of ROM 74.

Line card 70B is structurally similar to line card 70A. However, line card 70B includes RAM 44 in place of RAM 14. RAM 14 and RAM 44 operate according to the DDR-1 and DDR-2, respectively, protocols mentioned above in the Background section. ROM 74 of line card 70B stores the same operating system as stored in ROM 74 of line card 70A. ROM 74 of line card 70B also includes register 76, which permanently stores a configuration value. ASIC 72 of line card 70A or 70B is configured to operate according to any one of at least four modes depending on a configuration value stored in a configuration register 73 within ASIC 72. More specifically, ASIC 72 can operate in mode OM_A_DDR-1, OM_A_DDR-2, OM_B_DDR-1, or OM_B_DDR-2 when configuration value A_DDR-1, A_DDR-2, B_DDR-1, or B_DDR-2, respectively, is stored in ASIC 72's configuration register. Modes OM_A_DDR-1, OM_A_DDR-2, OM_B_DDR-1, and OM_B_DDR-2 were briefly described in the background section above. It is noted that FIGS. 5A and 5B show examples of line cards that could employ the present invention. In other examples, ASIC 72 could be coupled to devices other than RAM 14 or 44. ASIC 72 may include a map stored in memory, which is configured to translate the configuration value or a portion thereof into another value. Alternatively, ASIC 72 may include a decoder, which is configure to configure to translate the configuration value or a portion thereof into another value.

Figure 6:
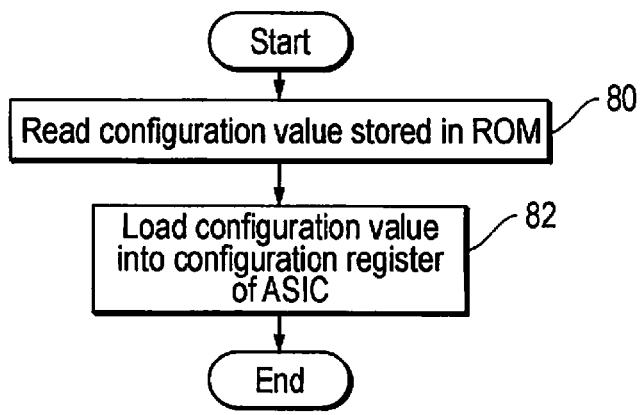
FIG. 6 illustrates relevant operational aspects performed by the microprocessors of FIGS. 3A and 3B.

Each time line card 70A or 70B is powered up, started or restarted, the operating system stored in ROM 74 is provided to and executed by microprocessor 22. The operating system, when executed, performs many functions, one of which is to unconditionally load the configuration register of ASIC 72 with the configuration value stored in register 76 of ROM 74. FIG. 6 is a flow chart illustrating relevant aspects performed by microprocessor 22 when it starts executing the operating system stored in ROM 20. In particular, as shown in step 80, microprocessor 22 reads the configuration value stored in register 76 of ROM 74. Thereafter in step 82, microprocessor 22 provides the configuration value read from register 76 to ASIC 72 for storage in its configuration register. The process then ends. To illustrate further, presume that register 76 of line card 70A stores configuration value A_DDR-1, while register 76 of line card 70B stores configuration value A_DDR-2. When line cards 70A and 70B are powered up or restarted, the microprocessors 22 of line cards 70A and 70B load the configuration values A_DDR-1 and A_DDR-2 stored in their respective registers 76 into the configuration registers of ASIC 72 and line cards 70A and 70B, respectively. Thereafter ASIC 72 operates according to the OM_A_DDR-1 mode, while ASIC 72 of line card 70B operates according to the OM_A_DDR-2 mode. Importantly, microprocessor 22 will load the configuration register of ASIC 72 without condition.

Figure 7:
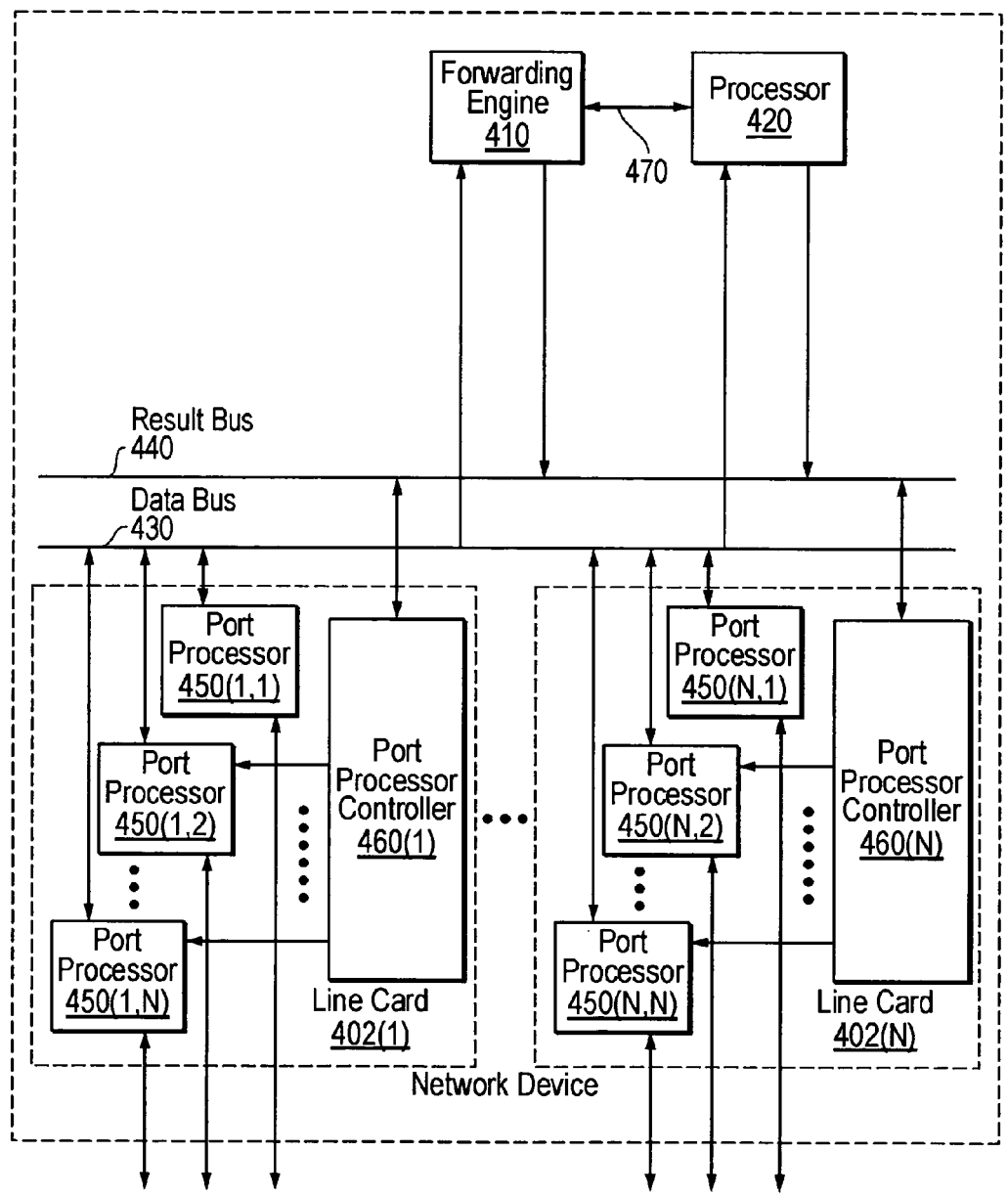
FIG. 7 is a simplified block diagram illustrating a network router element suitable for implementing embodiments of the present invention The use of the same reference symbols in different drawings indicates similar or identical items.

FIG. 7 is a simplified block diagram illustrating an example of a network routing device 400. In this depiction, network routing device 400 includes a number of line cards (line cards 402(1)-(N)) that are communicatively coupled to a forwarding engine 410 and a processor 420 via a data bus 430 and a result bus 440. Line cards 402(1)-(N) include a number of port processors 450(1,1)-(N,N) which are controlled by port processor controllers 460(1)-(N). It will also be noted that forwarding engine 410 and processor 420 are not only coupled to one another via data bus 430 and result bus 440, but are also communicatively coupled to one another by a communications link 470.

Because microprocessor 22 unconditionally loads the configuration register of its respective ASIC with the configuration value read from register 76, ASIC 72 could be successfully replaced with a newer, redesigned version that is configured to operate in additional modes, without having to modify the operating system stored in ROM 74.

The processors 450 and 460 of each line card 402 may be mounted on a single printed circuit board. Processors 450 and 460 of each line card 402 may be similar to microprocessor 22 described above. Although not shown in FIG. 7, an ASIC 72 and ROM 74 described above may be provided on each line card 402 for each processor 450 and 460. The respective ROMs 74 store a respective configuration value as set forth above. Moreover, each of the processors 450 and 460 may be configured to load their respective ASICs with configuration values read from their respective ROMs 74 without condition as described above.

When a packet is received, the packet is identified and analyzed by a network routing device such as network routing device 400 in the following manner, according to embodiments of the present invention. Upon receipt, a packet (or some or all of its control information) is sent from the one of port processors 450(1,1)-(N,N) at which the packet was received to one or more of those devices coupled to data bus 430 (e.g., others of port processors 450(1,1)-(N,N), forwarding engine 410 and/or processor 420). Handling of the packet can be determined, for example, by forwarding engine 410. For example, forwarding engine 410 may determine that the packet should be forwarded to one or more of port processors 450(1,1)-(N,N). This can be accomplished by indicating to corresponding one(s) of port processor controllers 460(1)-(N) that the copy of the packet held in the given one(s) of port processors 450(1,1)-(N,N) should be forwarded to the appropriate one of port processors 450(1,1)-(N,N).

In the foregoing process, network security information can be included in a frame sourced by network routing device 400 in a number of ways. For example, forwarding engine 410 can be used to detect the need for the inclusion of network security information in the packet, and processor 420 can be called into service to provide the requisite network security information. This network security information can be included in the packet during the transfer of the packet's contents from one of port processors 450(1,1)-(N,N) to another of port processors 450(1,1)-(N,N), by processor 420 providing the requisite information directly, or via forwarding engine 410, for example. The assembled packet at the receiving one of port processors 450(1,1)-(N,N) can thus be made to contain the requisite network security information.

In addition, or alternatively, once a packet has been identified for processing according to the present invention, forwarding engine 410, processor 420 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

The invention claimed is:

1. A line card comprising:
a printed circuit board;
a first integrated circuit (IC) mounted on the printed circuit board, the first IC comprises a first memory, the first IC is configured to operate in a first mode as a result of a first configuration value being stored in the first memory, and the first IC is configured to operate in a second mode as a result of a second configuration value being stored in the first memory;
a memory device mounted on the printed circuit board, the memory device stores the first configuration value;
a microprocessor mounted on the printed circuit board, the microprocessor is configured to provide a copy of the first configuration value stored in the memory device to the first IC for storage in the first memory without condition each time the line card is started or restarted.

2. The line card of claim 1, further comprising: the first IC comprises a map stored in memory, and the map is configured to translate the first configuration value or a portion thereof into a third value.

3. The line card of claim 1, further comprising: the first IC comprises a decoder, and the decoder is configured to translate the first configuration value or a portion thereof into a third value.

4. The line card of claim 1, further comprising:
the first IC comprises a second memory;
the memory device stores a third configuration value;
the microprocessor is configured to provide a copy of the third configuration value stored in the memory device to the first IC for storage in the second memory, and
the microprocessor is configured to provide the copy of the third configuration value to the first IC without condition.

5. An apparatus comprising:
a first line card comprising:
a first IC mounted on a first printed circuit board, the first IC is configured to operate in a first mode when a first value is provided to and stored in the first IC, and the first IC is configured to operate in a second mode when a second value is provided to and stored in the first IC;
a first microprocessor mounted on the first printed circuit board, the first microprocessor is configured to provide the first value to the first IC without condition when the first line card is started or restarted;
a second line card coupled to the first line card, the second line card comprising:
a second IC mounted on a second printed circuit board, the second IC is configured to operate in the first mode when the first value is provided to and stored in the second IC, and the second IC is configured to operate in the second mode when the second value is provided to and stored in the second IC;
a second microprocessor mounted on the second printed circuit board, the second microprocessor is configured to provide the second value to the second IC.

6. An apparatus comprising:
a printed circuit board;
an application specific integrated circuit (ASIC) mounted on the printed circuit board, the ASIC comprises a configuration register, the ASIC is configured to operate in a first mode when a first configuration value is stored in the configuration register, and the ASIC is configured to operate in a second mode when a second configuration value is stored in the configuration register;
a read only memory device mounted on the printed circuit board that stores the first configuration value;
a processor mounted on the printed circuit board, the processor is configured to provide a copy the first configuration value stored in the read only memory device to the ASIC without condition for storage in the configuration register each time the processor is started or restarted.

7. The apparatus of claim 6, further comprising:
the ASIC comprises a map stored in memory, and the map is configured to translate the first configuration value or a portion thereof into a third value.

8. The apparatus of claim 6 wherein the ASIC comprises a decoder, and the decoder is configured to translate the first configuration value or a portion thereof into a third value.

9. The apparatus of claim 6:

the ASIC comprises a second configuration register;

the read only memory device stores a third configuration value;

the processor is configured to provide a copy of the third configuration value stored in the read only memory device to the ASIC for storage in the second configuration register, and the processor is configured to provide the copy of the third configuration value to the ASIC without.

10. A method comprising:

a processor, mounted on a printed circuit board, reading a first configuration value from a read only memory device mounted on the printed circuit board, the processor reads the first configuration value without condition each time the processor is started or restarted;

the processor providing the first configuration value to an ASIC mounted on the printed circuit board;

the ASIC storing the first configuration value into a configuration register in the ASIC;

the ASIC is configured to operate in a first mode as a result of the first configuration value being stored in the configuration register, and the ASIC is configured to operate in a second mode as a result of a second configuration value being stored in the configuration register.

11. The method of claim 10, further comprising:

the ASIC translates the first configuration value or a portion thereof into a third value using a look-up table that maps a plurality of configuration values to respective operational values.

12. The method of claim 10, further comprising:

the ASIC decodes the first value or a portion thereof into a third value using a decoder.

13. The line card of claim 1, further comprising:

the providing obviates a need for a determining operation, the determining operation identifies a configuration associated with the line card.

14. The line card of claim 13, further comprising:

the microprocessor is configured to execute an operating system; and the operating system is configured to perform the determining operation.

15. The line card of claim 1, further comprising:

the providing is performed without comparing the copy of the first value to any other values.

16. The line card of claim 1, further comprising:

when configured to operate in the first mode, the first IC is compatible with a first protocol and incompatible with a second protocol;

when configured to operate in the second mode, the first IC is compatible with the first protocol and the second protocol;

the first protocol is double data rate one (DDR-1); and the second protocol is DDR-2.

* * * * *